United States Patent
Zeng et al.

(10) Patent No.: US 11,084,335 B2
(45) Date of Patent: Aug. 10, 2021

(54) TIRE LOCATION POSITIONING METHOD AND APPARATUS AND TIRE PRESSURE MONITORING SYSTEM

(71) Applicant: AUTEL INTELLIGENT TECHNOLOGY CORP., LTD., Guangdong (CN)

(72) Inventors: Feng Zeng, Guangdong (CN); Yongliang Luo, Guangdong (CN)

(73) Assignee: AUTEL INTELLIGENT TECHNOLOGY CORP., LTD., Shenzhen (CN)

(*) Notice: Subject to any disclaimer, the term of this patent is extended or adjusted under 35 U.S.C. 154(b) by 0 days.

(21) Appl. No.: 16/931,168

(22) Filed: Jul. 16, 2020

(65) Prior Publication Data

US 2020/0346500 A1   Nov. 5, 2020

Related U.S. Application Data

(63) Continuation-in-part of application No. PCT/CN2019/071058, filed on Jan. 10, 2019.

(30) Foreign Application Priority Data

Jan. 19, 2018   (CN) .......................... 201810054460.0

(51) Int. Cl.
   *B60C 23/04*   (2006.01)
   *G01S 13/75*   (2006.01)

(52) U.S. Cl.
   CPC ........ *B60C 23/0416* (2013.01); *G01S 13/751* (2013.01)

(58) Field of Classification Search
   CPC ........................... B60C 23/0416; G01S 13/751
   (Continued)

(56) References Cited

U.S. PATENT DOCUMENTS 8,584,517 B2 * 11/2013 Strahan ............... B60C 23/0477
                                                        73/146.5
8,600,607 B2 * 12/2013 Kessler ............... B60C 23/0488
                                                        701/29.1
(Continued)

FOREIGN PATENT DOCUMENTS

CN   101354303 A  *  1/2009   ......... B60C 23/0442
CN   101354303 A      1/2009
(Continued)

OTHER PUBLICATIONS

International Search Report dated Apr. 17, 2019; PCT/CN2019/071058.
(Continued)

*Primary Examiner* — Bernarr E Gregory
*Assistant Examiner* — Nuzhat Pervin

(57) ABSTRACT

Embodiments of the present invention relate to the field of automotive technologies, and disclose a tire location positioning method and apparatus, a tire pressure monitoring system (TPMS) receiver, a tire pressure sensor, a TPMS and an automobile. The method includes: controlling a first exciter to send a first excitation signal, and controlling a second exciter to send a second excitation signal; respectively receiving response signals that are generated according to the first excitation signal or the second excitation signal by all tire pressure sensors; performing positioning on front and rear wheels according to times when the response signals are received, to identify response signals sent by tire pressure sensors of the front and rear wheels; and performing positioning on left and right wheels according to the signal strength information, to identify response signals sent by tire pressure sensors of the left and right wheels.

7 Claims, 5 Drawing Sheets

(58) Field of Classification Search
USPC .......................................................... 342/125
See application file for complete search history.

(56) References Cited

U.S. PATENT DOCUMENTS

| | | | | |
|---|---|---|---|---|
| 2003/0197603 A1* | 10/2003 | Stewart | ............... | B60C 23/0444 340/442 |
| 2005/0088293 A1* | 4/2005 | Buck | ................... | B60C 23/0416 340/445 |
| 2005/0160804 A1* | 7/2005 | Brown | .................... | B60C 23/06 73/146 |
| 2006/0006992 A1 | 1/2006 | Daiss et al. | | |
| 2006/0017554 A1* | 1/2006 | Stewart | ............... | B60C 23/0416 340/447 |
| 2007/0068240 A1* | 3/2007 | Watabe | ............... | B60C 23/0462 73/146.5 |
| 2008/0068147 A1* | 3/2008 | Mori | .................. | B60C 23/0416 340/447 |
| 2008/0068148 A1* | 3/2008 | Mori | .................. | B60C 23/0416 340/447 |
| 2010/0109857 A1* | 5/2010 | Bennie | ................. | B60C 23/009 340/447 |
| 2011/0071737 A1* | 3/2011 | Greer | ................. | B60C 23/0416 701/49 |
| 2011/0308310 A1* | 12/2011 | Strahan | ............... | B60C 23/0416 73/146.5 |
| 2011/0313623 A1* | 12/2011 | Greer | .................. | B60C 23/0489 701/49 |
| 2014/0354421 A1* | 12/2014 | Kosugi | ............... | B60C 23/0488 340/447 |
| 2015/0231935 A1* | 8/2015 | Wagner | ............... | B60C 23/0488 702/141 |
| 2016/0236522 A1* | 8/2016 | Taki | .................... | B60C 23/0415 |
| 2017/0087944 A1* | 3/2017 | King | ..................... | B60C 23/003 |
| 2017/0174014 A1* | 6/2017 | Stewart | ............... | B60C 23/0437 |
| 2018/0111429 A1* | 4/2018 | Matsuoka | ........... | B60C 23/0416 |
| 2018/0361803 A1* | 12/2018 | Saburi | .................... | G01L 17/00 |

FOREIGN PATENT DOCUMENTS

| | | |
|---|---|---|
| CN | 102452279 A | 5/2012 |
| CN | 108248303 A | 7/2018 |

OTHER PUBLICATIONS

The First Chinese Office Action dated Mar. 4, 2019; Appln. No. 201810054460.0.

* cited by examiner

TIRE LOCATION POSITIONING METHOD AND APPARATUS AND TIRE PRESSURE MONITORING SYSTEM

This application is a continuation application of International Application No. PCT/CN2019/071058, filed on Jan. 10, 2019, which claims priority of Chinese Patent Application No. 201810054460.0, filed on Jan. 19, 2018, which is incorporated herein by reference in its entirety.

BACKGROUND

Technical Field

The present application relates to the field of automotive technologies, and in particular, to a tire location positioning method and apparatus, a tire pressure monitoring system (tire pressure monitoring system, TPMS) receiver, a tire pressure sensor, a TPMS including the TPMS receiver and the tire pressure sensor and an automobile including the TPMS.

Related Art

A TPMS performs real-time monitoring on main parameters such as pressure and temperature of an automobile tire in a traveling or stationary state by using a highly sensitive micro wireless sensing apparatus fastened inside the automobile tire, to ensure that the pressure and the temperature of the tire are maintained within standard ranges, thereby reducing a probability of a flat tire or tire damage and reducing fuel consumption and damage of automobile parts. The TPMS includes a plurality of highly sensitive tire pressure sensors mounted on each of the tires, which collect data such as the pressure and the temperature of the automobile tire in real time, and transmit the data to a central monitor included in the TPMS. Related data such as the pressure and the temperature of the automobile tire is displayed by the central monitor in real time in a digital form, and compared with a preset standard pressure value and a preset safe temperature. When the tire is abnormal, a driver is prompted in a form such as buzzing or voice to use a warning automobile active safety system (to prevent a flat tire).

Currently, the TPMS performs positioning on a tire location generally in two manners: 1. The tire location is identified according to an identifier (ID) of a tire pressure sensor. According to this manner, after the tire pressure sensor is mounted on a tire, the ID of the tire pressure sensor corresponding to the tire needs to be manually entered into the central monitor. If the entry is mistakenly performed in accident, a detection error will be caused. Moreover, during subsequent maintenance, if the tire is replaced or tire locations are exchanged, an ID of a new tire pressure sensor needs to be entered. Therefore, extremely inconvenience is caused. 2. Positioning is performed on left and right wheels based on an acceleration. In the method, there is no need to manually enter an ID, but the positioning on the left and right wheels can be completed only after the automobile has traveled a distance at a certain speed, real-time positioning cannot be performed, and positioning cannot be performed on the tires when the automobile is in a stationary state.

SUMMARY

A main objective of the present invention is to provide a tire location positioning method and apparatus, a TPMS receiver, a tire pressure sensor, a TPMS and an automobile, to identify tire locations in real time without manually entering IDs of tire pressure sensors, and achieve accurate and reliable identification results.

Embodiments of the present invention disclose the following technical solutions:

According to a first aspect, an embodiment of the present invention provides a tire location positioning method, the automobile including a left front wheel, a right front wheel, a left rear wheel and a right rear wheel, and each of the wheels being provided with a tire pressure sensor, where the automobile further includes a first exciter and a second exciter, the first exciter is configured to send a first excitation signal to the left front wheel and the right front wheel, and a distance between the first exciter and the left front wheel is unequal to a distance between the first exciter and the right front wheel; the second exciter is configured to send a second excitation signal to the left rear wheel and the right rear wheel, and a distance between the second exciter and the left rear wheel is unequal to a distance between the second exciter and the right rear wheel; and the method includes:

controlling the first exciter to send the first excitation signal, and controlling the second exciter to send the second excitation signal, where a time when the first excitation signal is sent is different from a time when the second excitation signal is sent;

respectively receiving response signals that are generated according to the first excitation signal or the second excitation signal by all the tire pressure sensors, where the response signals include signal strength information, the signal strength information being used for representing signal strength of receiving the first excitation signal or the second excitation signal;

performing positioning on front and rear wheels according to times when the response signals are received, to identify response signals sent by tire pressure sensors of the front and rear wheels; and performing positioning on left and right wheels according to the signal strength information, to identify response signals sent by tire pressure sensors of the left and right wheels.

In some embodiments, the time when the first excitation signal is sent is earlier than the time when the second excitation signal is sent; and the performing positioning on front and rear wheels according to times when the response signals are received, to identify response signals sent by tire pressure sensors of the front and rear wheels includes:

setting two response signals that are received earlier as response signals sent by tire pressure sensors of front wheels, where the front wheels include the left front wheel and the right front wheel; and setting two response signals that are received later as response signals sent by tire pressure sensors of rear wheels, where the rear wheels include the left rear wheel and the right rear wheel.

In some embodiments, the distance between the first exciter and the left front wheel is less than the distance between the first exciter and the right front wheel, and the distance between the second exciter and the left rear wheel is less than the distance between the second exciter and the right rear wheel; and the performing positioning on left and right wheels according to the signal strength information, to identify response signals sent by tire pressure sensors of the left and right wheels includes:

setting two response signals whose signal strength is greater than a preset signal strength threshold as response signals sent by tire pressure sensors of left wheels, where the left wheels include the left front wheel and the left rear wheel; and setting two response signals whose signal strength is less than the preset signal strength threshold as response signals sent by tire pressure sensors of right wheels, where the right wheels include the right front wheel and the right rear wheel.

In some embodiments, the method further includes:

controlling the first exciter to resend the first excitation signal and controlling the second exciter to resend the second excitation signal if a quantity of received response signals is less than a preset quantity threshold.

In some embodiments, the automobile further includes a spare tire, the spare tire being provided with a tire pressure sensor; and the method further includes:

after the left front wheel, the right front wheel, the left rear wheel and the right rear wheel are determined according to the positioning on the front and rear wheels and the positioning on the left and right wheels, setting, if a periodic positioning signal is received, the positioning signal as a positioning signal sent by the tire pressure sensor of the spare tire.

According to a second aspect, an embodiment of the present invention provides a tire location positioning method, the automobile including a TPMS receiver, where the method includes:

receiving an excitation signal;

generating a response signal according to the excitation signal, where the response signal includes signal strength information, the signal strength information being used for representing signal strength of receiving the excitation signal; and sending the response signal to the TPMS receiver.

In some embodiments, the method further includes:

determining, according to the signal strength information, a delay time for the generated response signal; and delaying the response signal according to the delay time.

According to a third aspect, an embodiment of the present invention provides a tire location positioning apparatus, including:

a first control module, configured to control a first exciter to send a first excitation signal, and control a second exciter to send a second excitation signal, where a time when the first excitation signal is sent is different from a time when the second excitation signal is sent;

a response signal receiving module, configured to respectively receive response signals that are generated according to the first excitation signal or the second excitation signal by all tire pressure sensors in a left front wheel, a right front wheel, a left rear wheel and a right rear wheel, where the response signals include signal strength information, the signal strength information being used for representing signal strength of receiving the first excitation signal or the second excitation signal;

a front and rear wheel positioning module, configured to perform positioning on front and rear wheels according to times when the response signals are received, to identify response signals sent by tire pressure sensors of the front and rear wheels; and a left and right wheel positioning module, configured to perform positioning on left and right wheels according to the signal strength information, to identify response signals sent by tire pressure sensors of the left and right wheels.

In some embodiments, in a case that the time when the first excitation signal is sent is earlier than the time when the second excitation signal is sent, the front and rear wheel positioning module is specifically configured to:

set two response signals that are received earlier as response signals sent by tire pressure sensors of front wheels, where the front wheels include the left front wheel and the right front wheel; and set two response signals that are received later as response signals sent by tire pressure sensors of rear wheels, where the rear wheels include the left rear wheel and the right rear wheel.

In some embodiments, in a case that the distance between the first exciter and the left front wheel is less than the distance between the first exciter and the right front wheel, and the distance between the second exciter and the left rear wheel is less than the distance between the second exciter and the right rear wheel, the left and right wheel positioning module is specifically configured to:

set two response signals whose signal strength is greater than a preset signal strength threshold as response signals sent by tire pressure sensors of left wheels, where the left wheels include the left front wheel and the left rear wheel; and set two response signals whose signal strength is less than the preset signal strength threshold as response signals sent by tire pressure sensors of right wheels, where the right wheels include the right front wheel and the right rear wheel.

In some embodiments, the apparatus further includes:

a second control module, configured to control the first exciter to resend the first excitation signal and control the second exciter to resend the second excitation signal if a quantity of received response signals is less than a preset quantity threshold.

In some embodiments, the apparatus further includes:

a spare tire positioning module, configured to: after the left front wheel, the right front wheel, the left rear wheel and the right rear wheel are determined according to the positioning on the front and rear wheels and the positioning on the left and right wheels, set, if a periodic positioning signal is received, the positioning signal as a positioning signal sent by the tire pressure sensor of the spare tire.

According to a fourth aspect, an embodiment of the present invention provides a tire location positioning apparatus, including:

an excitation signal receiving module, configured to receive an excitation signal;

a response signal generating module, configured to generate a response signal according to the excitation signal, where the response signal includes signal strength information, the signal strength information being used for representing signal strength of receiving the excitation signal; and a response signal sending module, configured to send the response signal.

In some embodiments, the apparatus further includes:

a delay time determining module, configured to determine, according to the signal strength information, a delay time for the generated response signal; and a response delay module, configured to delay the response signal according to the delay time.

According to a fifth aspect, an embodiment of the present invention provides a TPMS receiver, including:

at least one processor; and a memory that is communicatively connected to the at least one processor, where the memory stores an instruction executable by the at least one processor, the instruction, when executed by the at least one processor, enabling the at least one processor to perform the tire location positioning method described above.

According to a sixth aspect, an embodiment of the present invention provides a computer program product, including a computer program stored on a non-volatile computer-readable storage medium, the computer program including a program instruction, the program instruction, when executed by a TPMS receiver, causing the TPMS receiver to perform the tire location positioning method described above.

According to a seventh aspect, an embodiment of the present invention provides a non-volatile computer-readable storage medium, storing a computer-executable instruction, the computer-executable instruction being configured to cause a TPMS receiver to perform the tire location positioning method described above.

According to an eighth aspect, an embodiment of the present invention provides a tire pressure sensor, including:

at least one processor; and a memory that is communicatively connected to the at least one processor, where the memory stores an instruction executable by the at least one processor, the instruction, when executed by the at least one processor, enabling the at least one processor to perform the tire location positioning method described above.

According to a ninth aspect, an embodiment of the present invention provides a computer program product, including a computer program stored on a non-volatile computer-readable storage medium, the computer program including a program instruction, the program instruction, when executed by a tire pressure sensor, causing the tire pressure sensor to perform the tire location positioning method described above.

According to a tenth aspect, an embodiment of the present invention provides a non-volatile computer-readable storage medium, storing a computer-executable instruction, the computer-executable instruction being configured to cause a tire pressure sensor to perform the tire location positioning method described above.

According to an eleventh aspect, an embodiment of the present invention provides a TPMS, including the TPMS receiver described above and the tire pressure sensor described above.

According to a twelfth aspect, an embodiment of the present invention provides an automobile, including the TPMS described above.

In the embodiments of the present invention, positioning is performed on wheels according to times when response signals are received and signal strength information, so that tire locations can be identified in real time when an automobile is in a stationary or moving state without manually entering IDs of tire pressure sensors, and identification results are accurate and reliable.

BRIEF DESCRIPTION OF THE DRAWINGS

One or more embodiments are described by using examples with reference to the corresponding figures in the accompanying drawings, and these exemplary descriptions are not to be construed as limiting the embodiments. Elements in the accompanying drawings that have same reference numerals are represented as similar elements, and unless otherwise particularly stated, the figures in the accompanying drawings are not drawn to scale.

DETAILED DESCRIPTION

To make objectives, technical solutions and advantages of embodiments of the present invention clearer, the following clearly and completely describes the technical solutions in the embodiments of the present invention with reference to the accompanying drawings in the embodiments of the present invention. Apparently, the described embodiments are some rather than all of the embodiments of the present invention. All other embodiments obtained by persons of ordinary skill in the art based on the embodiments of the present invention without creative efforts shall fall within the protection scope of the present invention.

In addition, the following described technical features that are related in the implementations of the present invention may be mutually combined provided that there is no conflict between each other.

Embodiment 1

The embodiments of the present invention provide a tire location positioning method and apparatus, a TPMS receiver, a tire pressure sensor, a TPMS and an automobile. A tire location positioning system includes the TPMS receiver and the tire pressure sensor. The automobile includes the tire location positioning system. With the tire location positioning method, tire locations can be identified in real time when an automobile is in a stationary or moving state without manually entering IDs of tire pressure sensors, and identification results are accurate and reliable. The following describes an application environment of the method by using examples.

Figure 1:
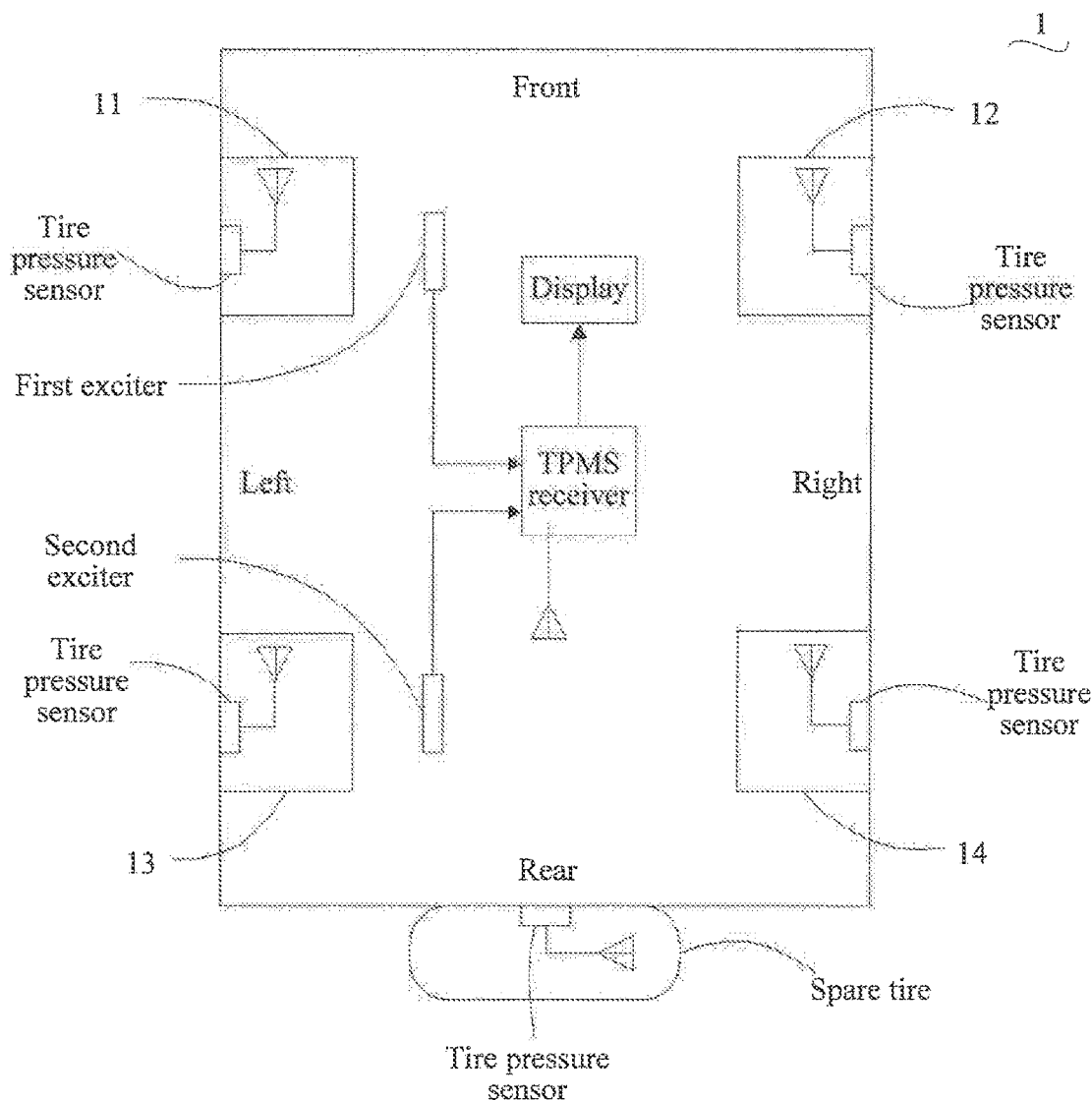
FIG. 1 is a schematic diagram of an application environment of a tire location positioning method according to an embodiment of the present invention.

FIG. 1 is a schematic diagram of an application environment of a tire location positioning method according to this embodiment of the present invention. An application scenario includes an automobile 1. The automobile 1 includes a left front wheel 11, a right front wheel 12, a left rear wheel 13, a right rear wheel 14 and a TPMS. The TPMS may include the tire location positioning system (including the TPMS receiver and the tire pressure sensor), a first exciter, a second exciter and a display. Moreover, the TPMS includes four tire pressure sensors. The left front wheel 11, the right front wheel 12, the left rear wheel 13 and the right rear wheel 14 each have one tire pressure sensor mounted. The first exciter is configured to send a first excitation signal to the left front wheel and the right front wheel, and a distance between the first exciter and the left front wheel is unequal to a distance between the first exciter and the right front wheel. The second exciter is configured to send a second excitation signal to the left rear wheel and the right rear wheel, and a distance between the second exciter and the left rear wheel is unequal to a distance between the second exciter and the right rear wheel. The first excitation signal and the second excitation signal are both used for activating the tire pressure sensors. The first exciter may be disposed on any position where the first excitation signal can act on the left front wheel and the right front wheel and the distance to the left front wheel is unequal to the distance to the right front wheel. The second exciter may be disposed on any position where the second excitation signal can act on the left rear wheel and the right rear wheel and the distance to the left rear wheel is unequal to the distance to the right rear wheel. For example, the first exciter is disposed on a front axle (not shown in the figure) and close to a left end of the front axle, and the second exciter is disposed on a rear axle (not shown in the figure) and close to a left end of the rear axle, so that the first excitation signal acts on the left front wheel and the right front wheel, and the second excitation signal acts on the left rear wheel and the right rear wheel. This example is used for description below.

Figure 2:
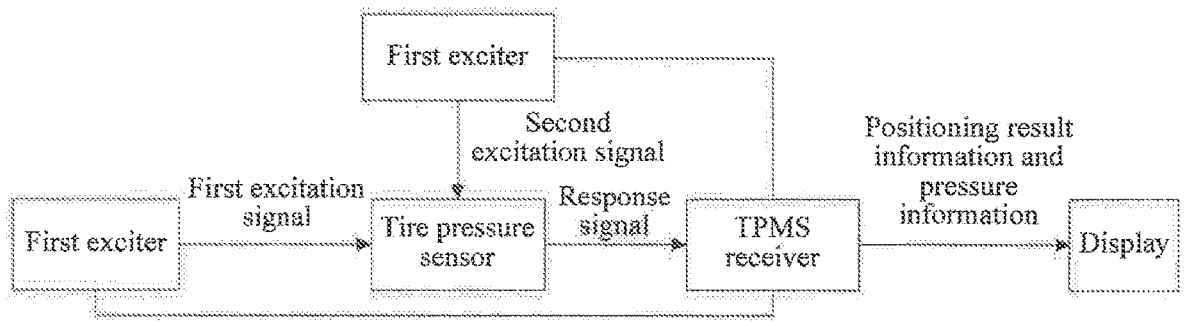
FIG. 2 is a schematic diagram of an implementation principle of application of a tire location positioning method according to an embodiment of the present invention.
Figure 3:
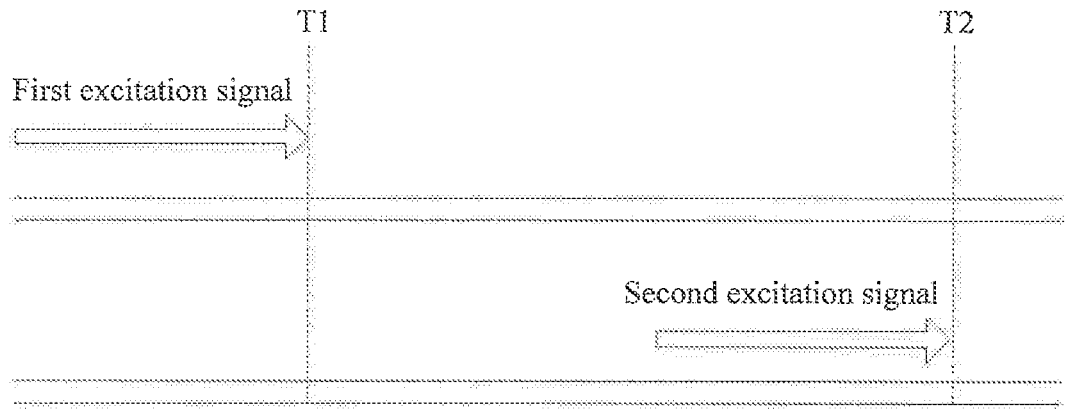
FIG. 3 is a sequence diagram of a first excitation signal and a second excitation signal according to an embodiment of the present invention.

FIG. 2 is a schematic diagram of an implementation principle of application of a tire location positioning method according to this embodiment of the present invention. The implementation principle mainly includes as follows:

1. The TPMS receiver controls the first exciter to send the first excitation signal, and controls the second exciter to send the second excitation signal. A time when the first excitation signal is sent is different from a time when the second excitation signal is sent. For example, the TPMS receiver controls the first exciter to send the first excitation signal, and after a preset time, controls the second exciter to send the second excitation signal. The TPMS receiver is separately connected to the first exciter and the second exciter, to control the first exciter to send the first excitation signal and control the second exciter to send the second excitation signal. FIG. 3 is a sequence diagram of the first excitation signal and the second excitation signal. As shown in FIG. 3, at a moment T1, the TPMS receiver controls the first exciter to send the first excitation signal, and after a preset time, namely, at a moment T2, the TPMS receiver controls the second exciter to send the second excitation signal. Transmission directions in which the first exciter sends the first excitation signal and the second exciter sends the second excitation signal and tire pressure sensors of left and right wheels are on a same axis, to ensure that the tire pressure sensors of the left and right wheels on the same axis all can receive the first excitation signal or the second excitation signal. The first exciter and the second exciter may be low-frequency exciters, and the first excitation signal and the second excitation signal that are sent may be low-frequency excitation signals.

2. The tire pressure sensor generates a response signal according to the first excitation signal or the second excitation signal, and sends the response signal to the TPMS receiver. The response signal may be a high-frequency response signal. As the transmission directions in which the first exciter sends the first excitation signal and the second exciter sends the second excitation signal and the tire pressure sensors of the left and right wheels are on the same axis, the first exciter is disposed on the front axle, and the second exciter is disposed on the rear axle, tire pressure sensors of front wheels (including the left front wheel 11 and the right front wheel 12) can receive only the first excitation signal sent by the first exciter, and tire pressure sensors of rear wheels (including the left rear wheel 13 and the right rear wheel 14) can receive only the second excitation signal sent by the second exciter. The tire pressure sensors of the left front wheel 11 and the right front wheel 12 receive the first excitation signal, generate response signals after being activated, and send the response signals to the TPMS receiver. The tire pressure sensors of the left rear wheel 13 and the right rear wheel 14 receive the second excitation signal, generate response signals after being activated, and send the response signals to the TPMS receiver. The response signals include signal strength information; the signal strength information being used for representing signal strength of receiving the first excitation signal or the second excitation signal. The signal strength information may be 1-byte information converted from a signal strength volume of receiving the first excitation signal or the second excitation signal, for example, a power byte P used for representing signal strength.

3. The TPMS receiver respectively receives response signals that are generated according to the first excitation signal or the second excitation signal by each tire pressure sensor. Because the left front wheel 11, the right front wheel 12, the left rear wheel 13 and the right rear wheel 14 each have one tire pressure sensor mounted, the TPMS receiver may receive four response signals.

4. The TPMS receiver performs positioning on front and rear wheels according to times when the response signals are received, to identify response signals sent by the tire pressure sensors of the front and rear wheels. As the tire pressure sensors of the front wheels can receive only the first excitation signal sent by the first exciter, the tire pressure sensors of the rear wheels can receive only the second excitation signal sent by the second exciter, and the time when the first exciter sends the first excitation signal is earlier than the time when the second exciter sends the second excitation signal, a time when the tire pressure sensors of the front wheels receive the first excitation signal is earlier than a time when the tire pressure sensors of the rear wheels receive the second excitation signal. That is, at the moment T1, the TPMS receiver controls the first exciter to send the first excitation signal, and the tire pressure sensors of the left front wheel 11 and the right front wheel 12 receive the first excitation signal, generate the response signals after being activated, and send the response signals to the TPMS receiver. After the preset time, namely, at the moment T2, the TPMS receiver controls the second exciter to send the second excitation signal, and the tire pressure sensors of the left rear wheel 13 and the right rear wheel 14 receive the second excitation signal, generate the response signals after being activated, and send the response signals to the TPMS receiver. Then the TPMS receiver may perform positioning on the front and rear wheels according to the times when the response signals are received. Specifically, two response signals that are received earlier are set as response signals sent by the tire pressure sensor of the left front wheel 11 and the tire pressure sensor of the right front wheel 12, and two response signals that are received later are set as response signals sent by the tire pressure sensor of the left rear wheel 13 and the tire pressure sensor of the right rear wheel 14.

5. The TPMS receiver performs positioning on left and right wheels according to the signal strength information, to identify response signals sent by tire pressure sensors of the left and right wheels. As the first exciter is disposed on the front axle and close to the left end of the front axle, and the second exciter is disposed on the rear axle and close to the left end of the rear axle, a first excitation signal or a second excitation signal received by tire pressure sensors of left wheels (including the left front wheel 11 and the left rear wheel 13) is stronger than a first excitation signal or a second excitation signal received by tire pressure sensors of right wheels (including the right front wheel 12 and the right rear wheel 14). In other words, signal strength represented by signal strength information of the response signals of the tire pressure sensors of the left front wheel 11 and the left rear wheel 13 is greater than signal strength represented by signal strength information of the response signals of the tire pressure sensors of the right front wheel 12 and the right rear wheel 14. The TPMS receiver may perform positioning on the left and right wheels according to the signal strength information. Specifically, two response signals whose signal strength is greater than a preset signal strength threshold are set as the response signals sent by the tire pressure sensor of the left front wheel 11 and the tire pressure sensor of the left rear wheel 13, and two response signals whose signal strength is less than the preset signal strength threshold are set as the response signals sent by the tire pressure sensor of the right front wheel 12 and the tire pressure sensor of the right rear wheel 14. For example, values of signal strength represented by signal strength information of the four response signals respectively are P1, P2, P3 and P4, the preset signal strength threshold is P, and the TPMS receiver learns, through comparison, that P1 and P2 are greater than P, and P3 and P4 are less than P. Then two response signals corresponding to P1 and P2 are set as the response signals sent by the tire pressure sensor of the left front wheel 11 and the tire pressure sensor of the left rear wheel 13, and two response signals corresponding to P3 and P4 are set as the response signals sent by the tire pressure sensor of the right front wheel 12 and the tire pressure sensor of the right rear wheel 14.

The TPMS receiver may identify, according to the times when the response signals are received and the signal strength information, the response signals sent by the tire pressure sensors of the wheels, that is, each of the response signals is from a tire pressure sensor of which wheel. In a general TPMS, a tire pressure sensor is mainly configured to collect pressure information of a tire. Therefore, the response signals may further include pressure information of tires. In other words, the TPMS receiver may determine, through the positioning on the front and rear wheels and the positioning on the left and right wheels, collected pressure information of a tire is from a tire pressure sensor of which wheel. If a tire is abnormal, a location of the abnormal tire may be quickly and conveniently determined.

6. The TPMS receiver sends positioning result information and the pressure information to the display. Through the positioning result information and the pressure information sending to the display, intuitive learning of the pressure information and the like of the tires is facilitated.

It should be noted that in this embodiment of the present invention, positioning may be first performed on the front and rear wheels according to the times when the response signals are received, to identify the response signals sent by the tire pressure sensors of the front and rear wheels. After the front and rear wheels are determined, positioning may be performed on the left and right wheels according to the signal strength information, to identify the response signals sent by the tire pressure sensors of the left and right wheels. In this way, the response signals sent by the tire pressure sensors of the wheels are identified. For example, the four response signals received by the TPMS receiver respectively are: a "response signal 1", a "response signal 2", a "response signal 3" and a "response signal 4". First, it is learned, through positioning on the front and rear wheels, that the "response signal 1" and the "response signal 2" are the response signals sent by the tire pressure sensors of the front wheels, and the "response signal 3" and the "response signal 4" are the response signals sent by the tire pressure sensors of the rear wheels. Then signal strength corresponding to the "response signal 1" and signal strength corresponding to the "response signal 2" are compared with the preset signal strength threshold. If the signal strength corresponding to the "response signal 1" is greater than the preset signal strength threshold, and the signal strength corresponding to the "response signal 2" is less than the preset signal strength threshold, the "response signal 1" is a response signal sent by the tire pressure sensor of the left front wheel 11, and the "response signal 2" is a response signal sent by the tire pressure sensor of the right front wheel 12. Signal strength corresponding to the "response signal 3" and signal strength corresponding to the "response signal 4" are compared with the preset signal strength threshold. If the signal strength corresponding to the "response signal 3" is greater than the preset signal strength threshold, and the signal strength corresponding to the "response signal 4" is less than the preset signal strength threshold, the "response signal 3" is a response signal sent by the tire pressure sensor of the left rear wheel 13, and the "response signal 4" is a response signal sent by the tire pressure sensor of the right rear wheel 14. Alternatively, positioning may be first performed on the left and right wheels according to the signal strength information, to identify the response signals sent by the tire pressure sensors of the left and right wheels. After the left and right wheels are determined, positioning may be performed on the front and rear wheels according to the times when the response signals are received, to identify the response signals sent by the tire pressure sensors of the front and rear wheels. In this way, the response signals sent by the tire pressure sensors of the wheels are identified.

It should be further noted that in this embodiment of the present invention, the automobile 1 may include automobiles of various types, for example, a passenger vehicle or a commercial vehicle. The TPMS receiver may include an electronic control unit (ECU) and the like, to send a control instruction to implement functions performed by the TPMS receiver.

It may be understood that in some other embodiments, the first exciter is disposed on the front axle and close to a right end of the front axle, and the second exciter is disposed on the rear axle and close to a right end of the rear axle. When the first exciter is close to the right end of the front axle, and the second exciter is close to the right end of the rear axle, the two response signals whose signal strength is greater than the preset signal strength threshold are set as the response signals sent by the tire pressure sensors of the right wheels, and the two response signals whose signal strength is less than the preset signal strength threshold are set as the response signals sent by the tire pressure sensors of the left wheels.

It may further be understood that in some other embodiments, the first exciter is disposed on the rear axle, and the second exciter is disposed on the front axle. In this case, the two response signals that are received earlier are set as the response signals sent by the tire pressure sensors of the rear wheels, and the two response signals that are received later are set as the response signals sent by the tire pressure sensors of the front wheels.

In this embodiment of the present invention, the TPMS receiver performs positioning on the wheels according to the times when the response signals are received and the signal strength information, so that tire locations can be identified in real time when the automobile is in a stationary or moving state without manually entering IDs of the tire pressure sensors, and identification results are accurate and reliable.

Embodiment 2

Figure 4:
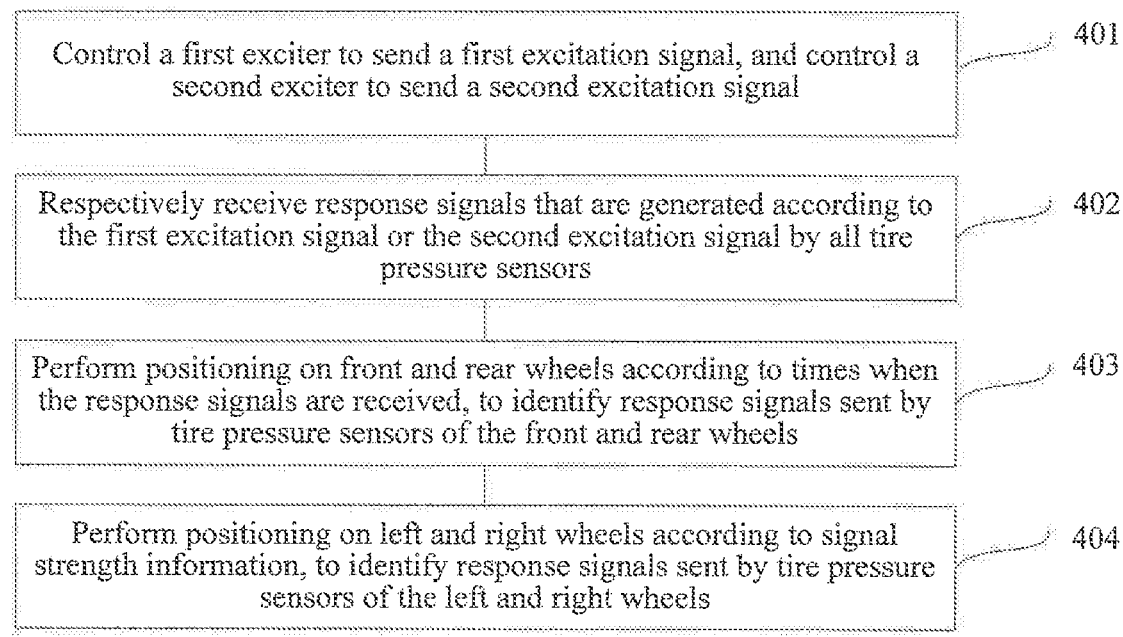
FIG. 4 is a schematic flowchart of a tire location positioning method according to an embodiment of the present invention.

FIG. 4 is a schematic flowchart of a tire location positioning method according to an embodiment of the present invention. The tire location positioning method provided in this embodiment of the present invention is applied to an automobile. The automobile includes a left front wheel, a right front wheel, a left rear wheel and a right rear wheel. The wheels are each provided with a tire pressure sensor. Moreover, the automobile further includes a first exciter and a second exciter. The first exciter is configured to send a first excitation signal to the left front wheel and the right front wheel, and a distance between the first exciter and the left front wheel is unequal to a distance between the first exciter and the right front wheel. The second exciter is configured to send a second excitation signal to the left rear wheel and the right rear wheel, and a distance between the second exciter and the left rear wheel is unequal to a distance between the second exciter and the right rear wheel. The method may be performed by the TPMS receiver of the automobile 1 in FIG. 1. The TPMS receiver may include an ECU and the like.

Referring to FIG. 4, the method includes the following steps:

401: Control the first exciter to send the first excitation signal, and control the second exciter to send the second excitation signal.

A time when the first excitation signal is sent is different from a time when the second excitation signal is sent. For example, the TPMS receiver first controls the first exciter to send the first excitation signal, and after a preset time, controls the second exciter to send the second excitation signal. The TPMS receiver is separately connected to the first exciter and the second exciter, to control the first exciter to send the first excitation signal and control the second exciter to send the second excitation signal. Transmission directions in which the first exciter sends the first excitation signal and the second exciter sends the second excitation signal and tire pressure sensors of left and right wheels are on a same axis, to ensure that the tire pressure sensors of the left and right wheels on the same axis all can receive the first excitation signal or the second excitation signal. Specifically, tire pressure sensors of front wheels (including the left front wheel and the right front wheel) may receive the first excitation signal, and tire pressure sensors of rear wheels (including the left rear wheel and right rear wheel) may receive the second excitation signal. The first exciter and the second exciter may be low-frequency exciters, and the first excitation signal and the second excitation signal that are sent may be low-frequency excitation signals.

402: Respectively receive response signals that are generated according to the first excitation signal or the second excitation signal by all the tire pressure sensors.

The TPMS receiver is separately communicatively connected to all the tire pressure sensors, to respectively receive the response signals that are generated according to the first excitation signal or the second excitation signal by all the tire pressure sensors. As the left front wheel, the right front wheel, the left rear wheel and the right rear wheel each have one tire pressure sensor mounted, the TPMS receiver may receive four response signals. The response signals each include signal strength information; the signal strength information being used for representing signal strength of receiving the first excitation signal or the second excitation signal. The signal strength information may be 1-byte information converted from a signal strength volume of receiving the first excitation signal or the second excitation signal, for example, a power byte P used for representing signal strength.

403: Perform positioning on front and rear wheels according to times when the response signals are received, to identify response signals sent by tire pressure sensors of the front and rear wheels.

As the tire pressure sensors of the front wheels can receive only the first excitation signal sent by the first exciter, the tire pressure sensors of the rear wheels can receive only the second excitation signal sent by the second exciter, and the time when the first exciter sends the first excitation signal is different from the time when the second exciter sends the second excitation signal, times when the tire pressure sensors of the front wheels receive the first excitation signal are also different from times when the tire pressure sensors of the rear wheels receive the second excitation signal. For example, the TPMS receiver controls the first exciter to send the first excitation signal, and the tire pressure sensors of the left front wheel and the right front wheel receive the first excitation signal, generate response signals after being activated, and send the response signals to the TPMS receiver. After the preset time, the TPMS receiver controls the second exciter to send the second excitation signal, and the tire pressure sensors of the left rear wheel and the right rear wheel receive the second excitation signal, generate response signals after being activated, and send the response signals to the TPMS receiver. In this way, the TPMS receiver may perform positioning on the front and rear wheels according to the times when the response signals are received, to identify the response signals sent by the tire pressure sensors of the front and rear wheels. For example, the four response signals received by the TPMS receiver respectively are: a "response signal 1", a "response signal 2", a "response signal 3" and a "response signal 4", and the "response signal 1" and the "response signal 2" are received by the TPMS receiver earlier than the "response signal 3" and the "response signal 4". Then it may be determined that the "response signal 1" and the "response signal 2" are the response signals sent by the tire pressure sensors of the front wheels, and the "response signal 3" and the "response signal 4" are the response signals sent by the tire pressure sensors of the rear wheels.

404: Perform positioning on left and right wheels according to the signal strength information, to identify response signals sent by tire pressure sensors of the left and right wheels.

As described above, the first exciter is configured to send the first excitation signal to the left front wheel and the right front wheel, and the distance between the first exciter and the left front wheel is unequal to the distance between the first exciter and the right front wheel; and the second exciter is configured to send the second excitation signal to the left rear wheel and the right rear wheel, and the distance between the second exciter and the left rear wheel is unequal to the distance between the second exciter and the right rear wheel. For example, the first exciter is disposed on a front axle and close to a left end of the front axle, and the second exciter is disposed on a rear axle and close to a left end of the rear axle. Therefore, a first excitation signal or a second excitation signal received by tire pressure sensors of left wheels (including the left front wheel and the left rear wheel) is stronger than a first excitation signal or a second excitation signal received by tire pressure sensors of the right wheels (including the right front wheel and the right rear wheel). In other words, signal strength represented by signal strength information of the response signals of the tire pressure sensors of the left front wheel and the left rear wheel is greater than signal strength represented by signal strength information of the response signals of the tire pressure sensors of the right front wheel and the right rear wheel. The TPMS receiver may perform positioning on the left and right wheels according to the signal strength information. For example, values of signal strength represented by signal strength information of the four response signals respectively are P1, P2, P3 and P4, and the TPMS receiver learns, through comparison, that P1 and P2 are greater than P3 and P4. Then two response signals corresponding to P1 and P2 are set as the response signals sent by the tire pressure sensor of the left front wheel and the tire pressure sensor of the left rear wheel, and two response signals corresponding to P3 and P4 are set as the response signals sent by the tire pressure sensor of the right front wheel and the tire pressure sensor of the right rear wheel.

The TPMS receiver may identify, according to the times when the response signals are received and the signal strength information, the response signals sent by the tire pressure sensors of the wheels, that is, each of the response signals is from a tire pressure sensor of which wheel. For example, positioning is first performed on the front and rear wheels according to the times when the response signals are received, to identify the response signals sent by the tire pressure sensors of the front and rear wheels. After the front and rear wheels are determined, positioning is performed on the left and right wheels according to the signal strength information, to identify the response signals sent by the tire pressure sensors of the left and right wheels. In this way, the response signals sent by the tire pressure sensors of the wheels are identified. Alternatively, positioning is first performed on the left and right wheels according to the signal strength information, to identify the response signals sent by the tire pressure sensors of the left and right wheels. After the left and right wheels are determined, positioning is performed on the front and rear wheels according to the times when the response signals are received, to identify the response signals sent by the tire pressure sensors of the front and rear wheels. In this way, the response signals sent by the tire pressure sensors of the wheels are identified.

It should be noted that, from the descriptions of this embodiment of the present invention, persons of ordinary skill in the art may understand that in different embodiments, steps 401 to 404 may be performed in different sequences. For example, step 404 is first performed and then step 403 is performed.

It should be noted that, for technical details that are not described in steps 401 to 404 in this embodiment of the present invention, reference may be made to the specific descriptions of the foregoing embodiment.

In this embodiment of the present invention, the TPMS receiver performs positioning on the front and rear wheels according to the times when the response signals are received, and performs positioning on the left and right wheels according to the signal strength information, so that tire locations can be identified in real time when the automobile is in a stationary or moving state without manually entering IDs of the tire pressure sensors, and identification results are accurate and reliable.

Embodiment 3

Figure 5:
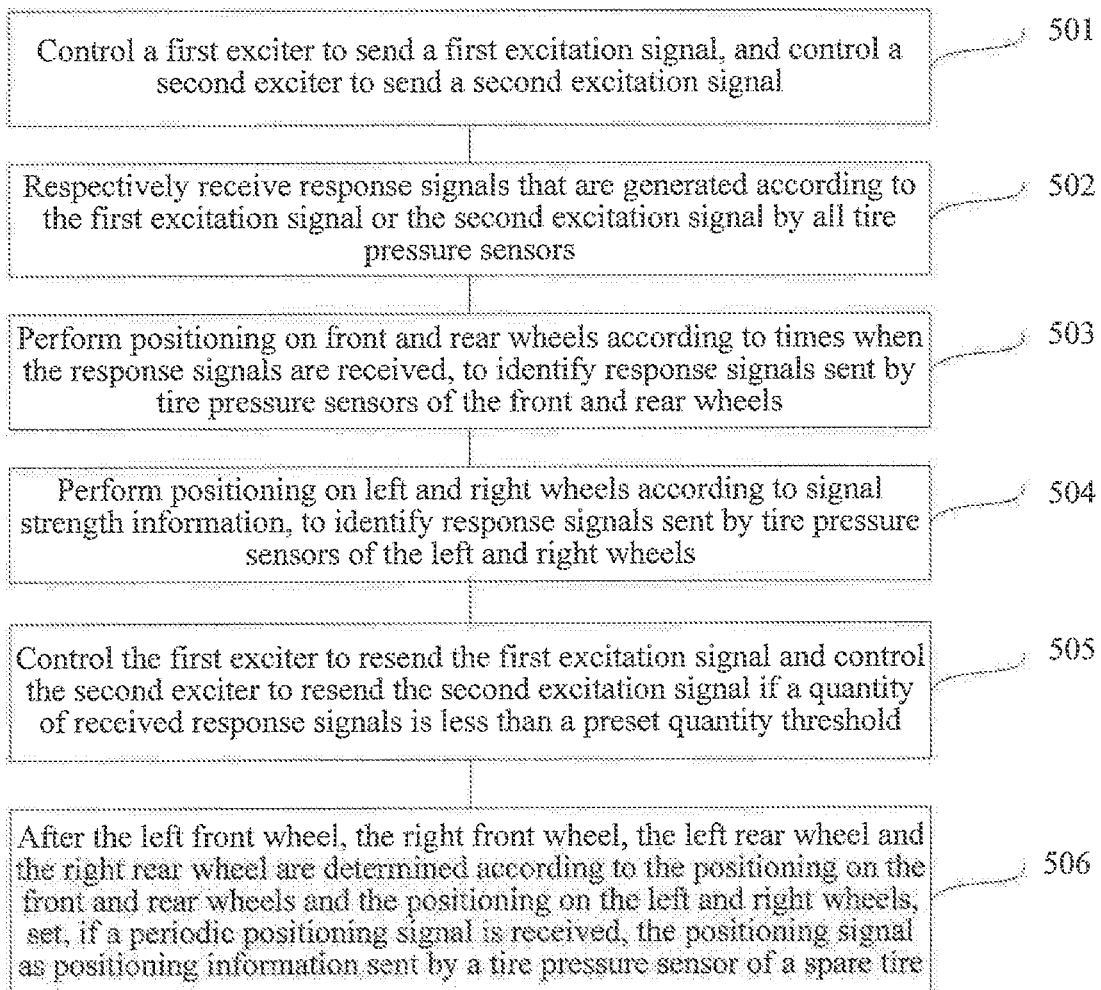
FIG. 5 is a schematic flowchart of a tire location positioning method according to another embodiment of the present invention.

FIG. 5 is a schematic flowchart of a tire location positioning method according to another embodiment of the present invention. The tire location positioning method provided in this embodiment of the present invention is applied to an automobile. The automobile includes a left front wheel, a right front wheel, a left rear wheel and a right rear wheel. The wheels are each provided with a tire pressure sensor. Moreover, the automobile further includes a first exciter and a second exciter. The first exciter is configured to send a first excitation signal to the left front wheel and the right front wheel, and a distance between the first exciter and the left front wheel is unequal to a distance between the first exciter and the right front wheel. The second exciter is configured to send a second excitation signal to the left rear wheel and the right rear wheel, and a distance between the second exciter and the left rear wheel is unequal to a distance between the second exciter and the right rear wheel. The method may be performed by the TPMS receiver of the automobile 1 in FIG. 1. The TPMS receiver may include an ECU and the like.

Referring to FIG. 5, the method includes the following steps:

501: Control the first exciter to send the first excitation signal, and control the second exciter to send the second excitation signal.

In this embodiment of the present invention, a time when the first excitation signal is sent is different from a time when the second excitation signal is sent. For example, the TPMS receiver controls the first exciter to send the first excitation signal, and after a preset time, controls the second exciter to send the second excitation signal. Transmission directions in which the first exciter sends the first excitation signal and the second exciter sends the second excitation signal and tire pressure sensors of left and right wheels are on a same axis, to ensure that the tire pressure sensors of the left and right wheels on the same axis all can receive the first excitation signal or the second excitation signal. Specifically, tire pressure sensors of front wheels (including the left front wheel and the right front wheel) may receive the first excitation signal, and tire pressure sensors of rear wheels (including the left rear wheel and right rear wheel) may receive the second excitation signal.

502: Respectively receive response signals that are generated according to the first excitation signal or the second excitation signal by all the tire pressure sensors.

The response signals include signal strength information; the signal strength information being used for representing signal strength of receiving the first excitation signal or the second excitation signal.

503: Perform positioning on front and rear wheels according to times when the response signals are received, to identify response signals sent by tire pressure sensors of the front and rear wheels.

As described above, the tire pressure sensors of the front wheels can receive only the first excitation signal sent by the first exciter, the tire pressure sensors of the rear wheels can receive only the second excitation signal sent by the second exciter, and the time when the first excitation signal is sent is different from the time when the second excitation signal is sent. For example, the time when the first exciter sends the first excitation signal is earlier than the time when the second exciter sends the second excitation signal. Therefore, times when the tire pressure sensors of the front wheels receive the first excitation signal are earlier than times when the tire pressure sensors of the rear wheels receive the second excitation signal. That is, the TPMS receiver controls the first exciter to send the first excitation signal, and the tire pressure sensors of the left front wheel and the right front wheel receive the first excitation signal, generate response signals after being activated, and send the response signals to a controller. After the preset time, the controller controls the second exciter to send the second excitation signal, and the tire pressure sensors of the left rear wheel and the right rear wheel receive the second excitation signal, generate response signals after being activated, and send the response signals to the controller. In this way, the controller may perform positioning on the front and rear wheels according to the times when the response signals are received, to identify the response signals sent by the tire pressure sensors of the front and rear wheels. Specifically, the time when the first excitation signal is sent is earlier than the time when the second excitation signal is sent. Two response signals that are received earlier are set as the response signals sent by the tire pressure sensors of the front wheels, where the front wheels include the left front wheel and the right front wheel; and two response signals that are received later are set as the response signals sent by the tire pressure sensors of the rear wheels, where the rear wheels include the left rear wheel and the right rear wheel. For example, four response signals received by the TPMS receiver respectively are: a "response signal 1", a "response signal 2", a "response signal 3" and a "response signal 4", the "response signal 1" and the "response signal 2" are two response signals that are received earlier in the four response signals received by the controller, and the "response signal 3" and the "response signal 4" are two response signals that are received later in the four response signals received by the TPMS receiver. Then it may be determined that the "response signal 1" and the "response signal 2" are the response signals sent by the tire pressure sensors of the front wheels, and the "response signal 3" and the "response signal 4" are the response signals sent by the tire pressure sensors of the rear wheels.

504: Perform positioning on left and right wheels according to the signal strength information, to identify response signals sent by tire pressure sensors of the left and right wheels.

As described above, the first exciter is configured to send the first excitation signal to the left front wheel and the right front wheel, and the second exciter is configured to send the second excitation signal to the left rear wheel and the right rear wheel; and the distance between the first exciter and the left front wheel is unequal to the distance between the first exciter and the right front wheel, and the distance between the second exciter and the left rear wheel is unequal to the distance between the first exciter and the right rear wheel. For example, the distance between the first exciter and the left front wheel is less than the distance between the first exciter and the right front wheel, and the distance between the second exciter and the left rear wheel is less than the distance between the second exciter and the right rear wheel.

For example, the first exciter is disposed on a front axle and close to a left end of the front axle, and the second exciter is disposed on a rear axle and close to a left end of the rear axle. Therefore, a first excitation signal or a second excitation signal received by tire pressure sensors of left wheels (including the left front wheel and the left rear wheel) is stronger than a first excitation signal or a second excitation signal received by tire pressure sensors of the right wheels (including the right front wheel and the right rear wheel). In other words, signal strength represented by signal strength information of the response signals of the tire pressure sensors of the left front wheel and the left rear wheel is greater than signal strength represented by signal strength information of the response signals of the tire pressure sensors of the right front wheel and the right rear wheel. The TPMS receiver may perform positioning on the left and right wheels according to the signal strength information. Specifically, two response signals whose signal strength is greater than a preset signal strength threshold are set as the response signals sent by the tire pressure sensors of the left wheels, where the left wheels include the left front wheel and the left rear wheel; and two response signals whose signal strength is less than the preset signal strength threshold are set as the response signals sent by the tire pressure sensors of the right wheels, where the left wheels include the right front wheel and the right rear wheel. For example, values of signal strength represented by signal strength information of the four response signals respectively are P1, P2, P3 and P4, the preset signal strength threshold is P, and the TPMS receiver learns, by comparing P with P1, P2, P3 and P4, that P1 and P2 are greater than P, and P3 and P4 are less than P. Then two response signals corresponding to P1 and P2 are set as the response signals sent y the tire pressure sensor of the left front wheel and the tire pressure sensor of the left rear wheel, and two response signals corresponding to P3 and P4 are set as the response signals sent by the tire pressure sensor of the right front wheel and the tire pressure sensor of the right rear wheel.

The TPMS receiver may identify, according to the times when the response signals are received and the signal strength information, the response signals sent by the tire pressure sensors of the wheels, that is, each of the response signals is from a tire pressure sensor of which wheel. For example, positioning is first performed on the front and rear wheels according to the times when the response signals are received, to identify the response signals sent by the tire pressure sensors of the front and rear wheels. After the front and rear wheels are determined, positioning is performed on the left and right wheels according to the signal strength information, to identify the response signals sent by tire pressure sensors of the left and right wheels. In this way, the response signals sent by the tire pressure sensors of the wheels are identified. Alternatively, positioning is first performed on the left and right wheels according to the signal strength information, to identify the response signals sent by the tire pressure sensors of the left and right wheels. After the left and right wheels are determined, positioning is performed on the front and rear wheels according to the times when the response signals are received, to identify the response signals sent by the tire pressure sensors of the front and rear wheels. In this way, the response signals sent by the tire pressure sensors of the wheels are identified.

505: Control the first exciter to resend the first excitation signal and control the second exciter to resend the second excitation signal if a quantity of received response signals is less than a preset quantity threshold.

After the TPMS receiver controls the first exciter to send the first excitation signal and controls the second exciter to send the second excitation signal, the tire pressure sensors may fail to successfully respond to the first excitation signal or the second excitation signal due to an external factor and the like, and therefore cannot generate response signals. In this case, the TPMS receiver needs to control the first exciter to resend the first excitation signal or control the second exciter to resend the second excitation signal, to avoid a packet loss.

If the quantity of response signals received by the TPMS receiver is less than the preset quantity threshold, that is, being less than 4, it is considered that a packet loss occurs. In this case, the TPMS receiver controls the first exciter to resend the first excitation signal and controls the second exciter to resend the second excitation signal. Subsequently, the TPMS receiver continues to monitor the quantity of received response signals, and stops resending until the quantity of received response signals is equal to the preset quantity threshold. In some embodiments, a times threshold may be preset. After a quantity of resending times reaches the preset times threshold, resending is stopped regardless of whether the quantity of received response signals is equal to the preset quantity threshold, to avoid a case in which the first exciter is repeatedly controlled to send the first excitation signal and the second exciter is repeatedly controlled to send the second excitation signal, but the quantity of received response signals never reaches the quantity threshold, for example, a case in which some of the four tire pressure sensors may be damaged, and cannot generate or send response signals.

In this embodiment of the present invention, the automobile further includes a spare tire, the spare tire being provided with a tire pressure sensor; and the method further includes the following step:

506: After the left front wheel, the right front wheel, the left rear wheel and the right rear wheel are determined according to the positioning on the front and rear wheels and the positioning on the left and right wheels, set, if a periodic positioning signal is received, the positioning signal as positioning information sent by the tire pressure sensor of the spare tire.

The response signals sent by the tire pressure sensors of the wheels, namely, the response signals sent by the tire pressure sensors of the left front wheel, the right front wheel, the left rear wheel and the right rear wheel, may be identified through steps 503 and 504. If the TPMS receiver further receives a periodic positioning signal, for example, a positioning signal that is sent with T as a period, the TPMS receiver sets the positioning signal as positioning information sent by the tire pressure sensor of the spare tire, to perform positioning on the spare tire.

It may be understood that, in some other embodiments, steps 505 and 506 may be optional steps in different embodiments. In addition, from the descriptions of this embodiment of the present invention, persons of ordinary skill in the art may understand that in different embodiments, steps 501 to 506 may be performed in different sequences.

It should be further noted that, for technical details that are not described in steps 501 to 506 in this embodiment of the present invention, reference may be made to the specific descriptions of the foregoing embodiment.

In this embodiment of the present invention, the TPMS receiver performs positioning on the front and rear wheels according to the times when the response signals are received, and performs positioning on the left and right wheels according to the signal strength information, so that tire locations can be identified in real time when the automobile is in a stationary or moving state without manually entering IDs of the tire pressure sensors, and identification results are accurate and reliable.

Embodiment 4

Figure 6:
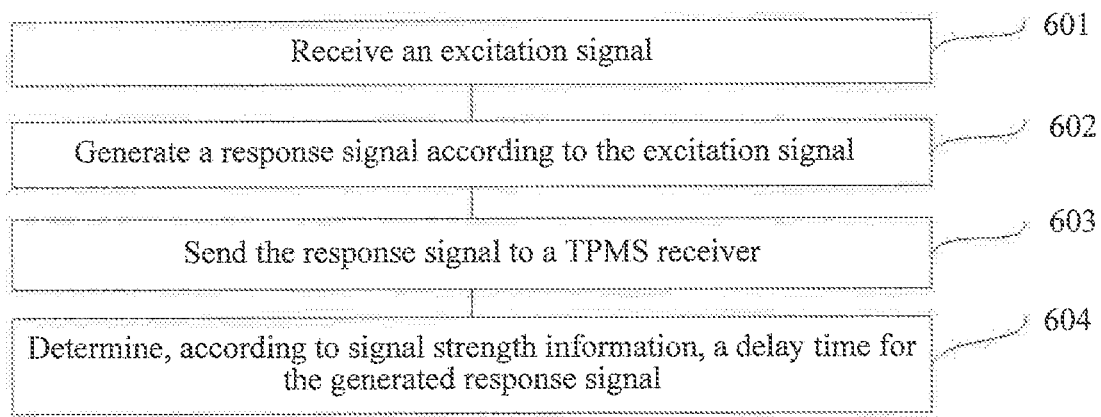
FIG. 6 is a schematic flowchart of a tire location positioning method according to another embodiment of the present invention.

FIG. 6 is a schematic flowchart of a tire location positioning method according to another embodiment of the present invention. The tire location positioning method provided in this embodiment of the present invention is applied to an automobile. The automobile includes a TPMS receiver. The automobile further includes a first exciter and a second exciter. The first exciter is configured to send a first excitation signal to a left front wheel and a right front wheel, and a distance between the first exciter and the left front wheel is unequal to a distance between the first exciter and the right front wheel. The second exciter is configured to send a second excitation signal to a left rear wheel and a right rear wheel, and a distance between the second exciter and the left rear wheel is unequal to a distance between the second exciter and the right rear wheel. The method may be performed by the tire pressure sensors of the automobile 1 in FIG. 1.

Referring to FIG. 6, the method includes the following steps:

601: Receive an excitation signal.

Specifically, the tire pressure sensors receive the first excitation signal sent by the first exciter or the second excitation signal sent by the second exciter. Each of the tire pressure sensors can receive only one of the first excitation signal and the second excitation signal. For example, a tire pressure sensor receives the first excitation signal, then the tire pressure sensor cannot receive the second excitation signal.

602: Generate a response signal according to the excitation signal.

The tire pressure sensors generate response signals according to the first excitation signal or the second excitation signal. Transmission directions in which the first exciter sends the first excitation signal and the second exciter sends the second excitation signal and tire pressure sensors of left and right wheels are on a same axis. For example, the first exciter is disposed on a front axle, and the second exciter is disposed on a rear axle. Therefore, tire pressure sensors of front wheels (including the left front wheel and the right front wheel) can receive only the first excitation signal sent by the first exciter, and tire pressure sensors of rear wheels (including the left rear wheel and the right rear wheel) can receive only the second excitation signal sent by the second exciter. The tire pressure sensors of the left front wheel and the right front wheel receive the first excitation signal, and generate response signals after being activated. The tire pressure sensors of the left rear wheel and the right rear wheel receive the second excitation signal, and generate response signals after being activated. The response signals include signal strength information; the signal strength information being used for representing signal strength of receiving the first excitation signal or the second excitation signal. The response signals are the same as the response signals in the foregoing embodiments. Therefore, details are not described herein again.

603: Send the response signal to the TPMS receiver.

All the tire pressure sensors send the generated response signals to the TPMS receiver, and the TPMS receiver performs positioning on the wheels according to times when the response signals are received and the signal strength information.

604: Determine, according to the signal strength information, a delay time for the generated response signal.

In this embodiment of the present invention, the delay time may be proportional to signal strength corresponding to the response signal, that is, the delay time $t=k*p$ (k is a natural number, and p is corresponding signal strength). For example, signal strength corresponding to a response signal sent by the tire pressure sensor of the left front wheel is P1, and signal strength corresponding to a response signal sent by the tire pressure sensor of the right front wheel is P2. Then a delay time of the response signal sent by the tire pressure sensor of the left front wheel is $k*P1$, and a delay time of the response signal sent by the tire pressure sensor of the right front wheel is $k*P2$.

605: Delay the response signal according to the delay time.

As the first excitation signal and the second excitation signal are sent at different times, no packet overlap phenomenon occurs when the response signals sent by the tire pressure sensors of the front and rear wheels are received by the TPMS receiver. That is, during a process of receiving the response signals sent by the front wheels by the TPMS receiver, the response signals sent by the rear wheels are not received, to avoid packet overlap. However, packet overlap may occur when the response signals sent by the tire pressure sensors of the left and right wheels are received by the TPMS receiver. To prevent the packet overlap, the response signals may be delayed. As signal strength represented by signal strength information included in the response signals generated by the tire pressure sensors of the left wheels is greater than signal strength represented by signal strength information included in the response signals generated by the tire pressure sensors of the right wheels, the tire pressure sensors may determine, according to the signal strength information, delay times of generating the response signals, and then delay the response signals according to the delay times, so that times when the TPMS receiver receives the response signals sent by the tire pressure sensors of the left wheels and receives the response signals sent by the tire pressure sensors of the right wheels are different, thereby effectively avoiding packet overlap when the TPMS receiver receives the response signals of the tire pressure sensors of the left and right wheels. That the tire pressure sensors delay the response signals according to the delay times may be as follows: the tire pressure sensors delay, according to the delay times, generating the response signals, or the tire pressure sensors delay, according to the delay times, sending the response signals to the TPMS receiver.

It should be noted that, for technical details that are not described in steps 601 to 605 in this embodiment of the present invention, reference may be made to the specific descriptions of the foregoing embodiment.

It may be understood that, in some other embodiments, steps 604 and 605 may be optional steps in different embodiments. In addition, from the descriptions of this embodiment of the present invention, persons of ordinary skill in the art may understand that in different embodiments, steps 601 to 605 may be performed in different sequences. For example, steps 604 and 605 are first performed, and then step 603 is performed.

It should be further noted that, for technical details that are not described in steps 601 to 605 in this embodiment of the present invention, reference may be made to the specific descriptions of the foregoing embodiment.

In this embodiment of the present invention, the tire pressure sensors generate the response signals according to the excitation signals, and send the response signals to the TPMS receiver, and the controller performs positioning on the front and rear wheels according to the times of the response signals, and performs positioning on the left and right wheels according to the signal strength information, so that tire locations can be identified in real time when the automobile is in a stationary or moving state without manually entering IDs of the tire pressure sensors, and identification results are accurate and reliable.

Embodiment 5

Figure 7:
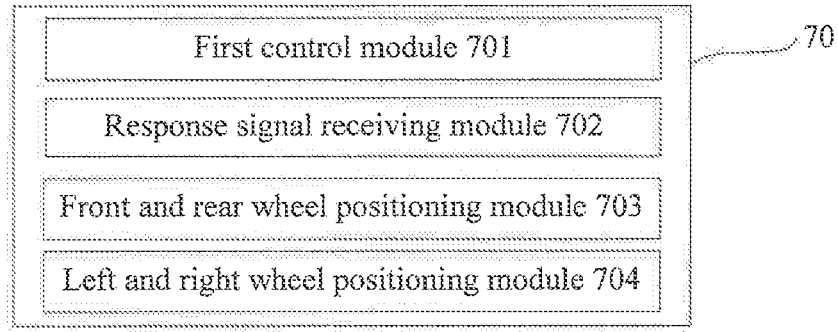
FIG. 7 is a schematic diagram of a tire location positioning apparatus according to an embodiment of the present invention.

FIG. 7 is a schematic diagram of a tire location positioning apparatus according to an embodiment of the present invention. The tire location positioning apparatus provided in this embodiment of the present invention may be configured in a TPMS receiver of an automobile. The automobile includes a left front wheel, a right front wheel, a left rear wheel and a right rear wheel. The wheels are each provided with a tire pressure sensor. The automobile further includes a first exciter and a second exciter. The first exciter is configured to send a first excitation signal to the left front wheel and the right front wheel, and a distance between the first exciter and the left front wheel is unequal to a distance between the first exciter and the right front wheel. The second exciter is configured to send a second excitation signal to the left rear wheel and the right rear wheel, and a distance between the second exciter and the left rear wheel is unequal to a distance between the second exciter and the right rear wheel.

Referring to FIG. 7, the apparatus 70 includes the following modules:

A first control module 701 is configured to control the first exciter to send the first excitation signal, and control the second exciter to send the second excitation signal.

A time when the first excitation signal is sent is different from a time when the second excitation signal is sent. For example, the first control module 701 first controls the first exciter to send the first excitation signal, and after a preset time, controls the second exciter to send the second excitation signal. Transmission directions in which the first exciter sends the first excitation signal and the second exciter sends the second excitation signal under control of the first control module 701 and tire pressure sensors of left and right wheels to be on a same axis, to ensure that the tire pressure sensors of the left and right wheels on the same axis all can receive the first excitation signal or the second excitation signal. Specifically, tire pressure sensors of front wheels (including the left front wheel and the right front wheel) may receive the first excitation signal, and tire pressure sensors of rear wheels (including the left rear wheel and right rear wheel) may receive the second excitation signal.

A response signal receiving module 702 is configured to respectively receive response signals that are generated according to the first excitation signal or the second excitation signal by all the tire pressure sensors in the left front wheel, the right front wheel, the left rear wheel and the right rear wheel.

As the left front wheel, the right front wheel, the left rear wheel and the right rear wheel each have one tire pressure sensor mounted, the response signal receiving module 702 may receive four response signals. The response signals each include signal strength information; the signal strength information being used for representing signal strength of receiving the first excitation signal or the second excitation signal. The signal strength information may be 1-byte information converted from a signal strength volume of receiving the first excitation signal or the second excitation signal, for example, a power byte P used for representing signal strength.

A front and rear wheel positioning module 703 is configured to perform positioning on front and rear wheels according to times when the response signals are received, to identify response signals sent by tire pressure sensors of the front and rear wheels.

As described above, the tire pressure sensors of the front wheels can receive only the first excitation signal sent by the first exciter, the tire pressure sensors of the rear wheels can receive only the second excitation signal sent by the second exciter, and the time when the first excitation signal is sent is different from the time when the second excitation signal is sent. For example, the time when the first exciter sends the first excitation signal is earlier than the time when the second exciter sends the second excitation signal. Therefore, a time when the tire pressure sensors of the front wheels receive the first excitation signal is earlier than a time when the tire pressure sensors of the rear wheels receive the second excitation signal. Accordingly, the front and rear wheel positioning module 703 may perform positioning on the front and rear wheels according to the times when the response signals are received, to identify the response signals sent by the tire pressure sensors of the front and rear wheels.

A left and right wheel positioning module 704 is configured to perform positioning on left and right wheels according to the signal strength information, to identify response signals sent by tire pressure sensors of the left and right wheels.

As described above, the first exciter is configured to send the first excitation signal to the left front wheel and the right front wheel, and the second exciter is configured to send the second excitation signal to the left rear wheel and the right rear wheel; and the distance between the first exciter and the left front wheel is unequal to the distance between the first exciter and the right front wheel, and the distance between the second exciter and the left rear wheel is unequal to the distance between the second exciter and the right rear wheel. For example, the distance between the first exciter and the left front wheel is less than the distance between the first exciter and the right front wheel, and the distance between the second exciter and the left rear wheel is less than the distance between the second exciter and the right rear wheel. For example, the first exciter is disposed on a front axle and close to a left end of the front axle, and the second exciter is disposed on a rear axle and close to a left end of the rear axle. Therefore, a first excitation signal or a second excitation signal received by tire pressure sensors of left wheels (including the left front wheel and the left rear wheel) is stronger than a first excitation signal or a second excitation signal received by tire pressure sensors of the right wheels (including the right front wheel and the right rear wheel). In other words, signal strength represented by signal strength information of the response signals of the tire pressure sensors of the left front wheel and the left rear wheel is greater than signal strength represented by signal strength information of the response signals of the tire pressure sensors of the right front wheel and the right rear wheel. The left and right wheel positioning module 704 may perform positioning on the left and right wheels according to the signal strength information.

It should be noted that in this embodiment of the present invention, the tire location positioning apparatus 70 may perform the tire location positioning method provided in Embodiment 2 of the present invention, and have corresponding functional modules and beneficial effects of performing the method. For technical details that are not described in the embodiment of the tire location positioning apparatus 70, reference may be made to the tire location positioning method provided in Embodiment 2 of the present invention.

Embodiment 6

Figure 8:
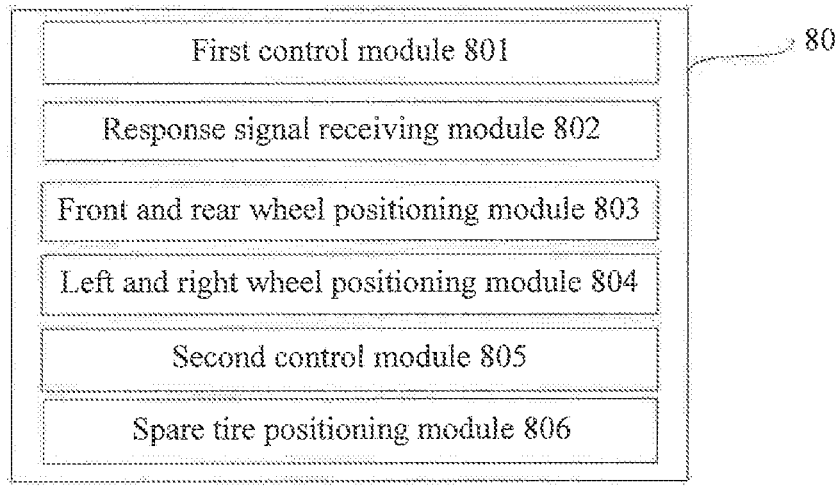
FIG. 8 is a schematic diagram of a tire location positioning apparatus according to another embodiment of the present invention.

FIG. 8 is a schematic diagram of a tire location positioning apparatus according to another embodiment of the present invention. The tire location positioning apparatus provided in this embodiment of the present invention may be configured in a TPMS receiver of an automobile. The automobile further includes a first exciter and a second exciter. The first exciter is configured to send a first excitation signal to a left front wheel and a right front wheel, and a distance between the first exciter and the left front wheel is unequal to a distance between the first exciter and the right front wheel. The second exciter is configured to send a second excitation signal to a left rear wheel and a right rear wheel, and a distance between the second exciter and the left rear wheel is unequal to a distance between the second exciter and the right rear wheel.

Referring to FIG. 8, the apparatus 80 includes the following modules:

A first control module 801 is configured to control the first exciter to send the first excitation signal, and control the second exciter to send the second excitation signal.

A time when the first excitation signal is sent is different from a time when the second excitation signal is sent. For example, the first control module 801 first controls the first exciter to send the first excitation signal, and after a preset time, controls the second exciter to send the second excitation signal. Transmission directions in which the first exciter sends the first excitation signal and the second exciter sends the second excitation signal and tire pressure sensors of left and right wheels are on a same axis, to ensure that the tire pressure sensors of the left and right wheels on the same axis all can receive the first excitation signal or the second excitation signal. Specifically, tire pressure sensors of front wheels (including the left front wheel and the right front wheel) may receive the first excitation signal, and tire pressure sensors of rear wheels (including the left rear wheel and right rear wheel) may receive the second excitation signal.

A response signal receiving module 802 is configured to respectively receive response signals that are generated according to the first excitation signal or the second excitation signal by all the tire pressure sensors in the left front wheel, the right front wheel, the left rear wheel and the right rear wheel.

The response signals include signal strength information; the signal strength information being used for representing signal strength of receiving the first excitation signal or the second excitation signal.

A front and rear wheel positioning module 803 is configured to perform positioning on front and rear wheels according to times when the response signals are received, to identify response signals sent by tire pressure sensors of the front and rear wheels.

As described above, the tire pressure sensors of the front wheels can receive only the first excitation signal sent by the first exciter, the tire pressure sensors of the rear wheels can receive only the second excitation signal sent by the second exciter, and the time when the first excitation signal is sent is different from the time when the second excitation signal is sent. For example, the time when the first exciter sends the first excitation signal is earlier than the time when the second exciter sends the second excitation signal. Therefore, the front and rear wheel positioning module 803 may perform positioning on the front and rear wheels according to the times when the response signals are received, to identify the response signals sent by the tire pressure sensors of the front and rear wheels. In a case that the time when the first excitation signal is sent is earlier than the time when the second excitation signal is sent, the front and rear wheel positioning module 803 is specifically configured to: in a case that the time when the first excitation signal is sent is earlier than the time when the second excitation signal is sent, set two response signals that are received earlier as response signals sent by the tire pressure sensors of the front wheels, where the front wheels include the left front wheel and the right front wheel; and set two response signals that are received later as response signals sent by the tire pressure sensors of the rear wheels, where the rear wheels include the left rear wheel and the right rear wheel.

A left and right wheel positioning module 804 is configured to perform positioning on left and right wheels according to the signal strength information, to identify response signals sent by tire pressure sensors of the left and right wheels.

As described above, the first exciter is configured to send the first excitation signal to the left front wheel and the right front wheel, and the second exciter is configured to send the second excitation signal to the left rear wheel and the right rear wheel; and the distance between the first exciter and the left front wheel is unequal to the distance between the first exciter and the right front wheel, and the distance between the second exciter and the left rear wheel is unequal to the distance between the second exciter and the right rear wheel. For example, the distance between the first exciter and the left front wheel is less than the distance between the first exciter and the right front wheel, and the distance between the second exciter and the left rear wheel is less than the distance between the second exciter and the right rear wheel. For example, the first exciter is disposed on a front axle and close to a left end of the front axle, and the second exciter is disposed on a rear axle and close to a left end of the rear axle. Therefore, a first excitation signal or a second excitation signal received by tire pressure sensors of left wheels (including the left front wheel and the left rear wheel) is stronger than a first excitation signal or a second excitation signal received by tire pressure sensors of the right wheels (including the right front wheel and the right rear wheel). In other words, signal strength represented by signal strength information of the response signals of the tire pressure sensors of the left front wheel and the left rear wheel is greater than signal strength represented by signal strength information of the response signals of the tire pressure sensors of the right front wheel and the right rear wheel. Accordingly, the left and right wheel positioning module 804 may perform positioning on the left and right wheels according to the signal strength information. In a case the distance between the first exciter and the left front wheel is less than the distance between the first exciter and the right front wheel, and the distance between the second exciter and the left rear wheel is less than the distance between the second exciter and the right rear wheel, the left and right wheel positioning module 804 is specifically configured to: set two response signals whose signal strength is greater than a preset signal strength threshold as response signals sent by the tire pressure sensors of the left wheels, where the left wheels include the left front wheel and the left rear wheel; and set two response signals whose signal strength is less than the preset signal strength threshold as response signals sent by the tire pressure sensors of the right wheels, where the right wheels include the right front wheel and the right rear wheel.

A second control module 805 is configured to control the first exciter to resend the first excitation signal and control the second exciter to resend the second excitation signal if a quantity of received response signals is less than a preset quantity threshold.

The second control module 805 controls the first exciter to resend the first excitation signal and controls the second exciter to resend the second excitation signal, to avoid a packet loss.

A spare tire positioning module 806 is configured to: after the left front wheel, the right front wheel, the left rear wheel and the right rear wheel are determined according to the positioning on the front and rear wheels and the positioning on the left and right wheels, set, if a periodic positioning signal is received, the positioning signal as a positioning signal sent by the tire pressure sensor of the spare tire.

Positioning may be performed on the spare tire by using the spare tire positioning module 806.

It should be noted that in this embodiment of the present invention, the tire location positioning apparatus 80 may perform the tire location positioning method provided in Embodiment 3 of the present invention, and have corresponding functional modules and beneficial effects of performing the method. For technical details that are not described in the embodiment of the tire location positioning apparatus 80, reference may be made to the tire location positioning method provided in Embodiment 3 of the present invention.

Embodiment 7

Figure 9:
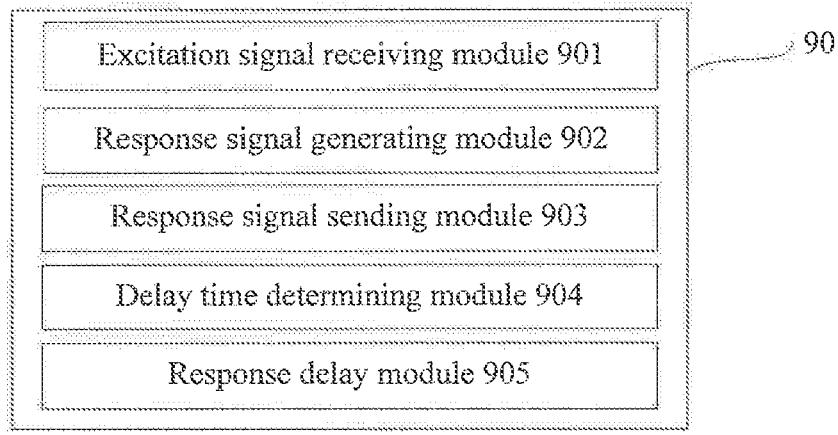
FIG. 9 is a schematic diagram of a tire location positioning apparatus according to another embodiment of the present invention.

FIG. 9 is a schematic diagram of a tire location positioning apparatus according to another embodiment of the present invention. The tire location positioning apparatus provided in this embodiment of the present invention may be configured in tire pressure sensors of an automobile. The automobile includes a TPMS receiver. The automobile further includes a first exciter and a second exciter. The first exciter is configured to send a first excitation signal to a left front wheel and a right front wheel, and a distance between the first exciter and the left front wheel is unequal to a distance between the first exciter and the right front wheel. The second exciter is configured to send a second excitation signal to a left rear wheel and a right rear wheel, and a distance between the second exciter and the left rear wheel is unequal to a distance between the second exciter and the right rear wheel.

Referring to FIG. 9, the apparatus 90 includes the following modules:

An excitation signal receiving module 901 is configured to receive an excitation signal.

A response signal generating module 902 is configured to generate a response signal according to the excitation signal.

The response signals include signal strength information; the signal strength information being used for representing signal strength of receiving the first excitation signal or the second excitation signal.

A response signal sending module 903 is configured to send the response signal.

A delay time determining module 904 is configured to determine, according to the signal strength information, a delay time for the generated response signal.

A response delay module 905 is configured to delay the response signal according to the delay time.

It should be noted that in this embodiment of the present invention, the tire location positioning apparatus 90 may perform the tire location positioning method provided in Embodiment 4 of the present invention, and have corresponding functional modules and beneficial effects of performing the method. For technical details that are not described in the embodiment of the tire location positioning apparatus 90, reference may be made to the tire location positioning method provided in Embodiment 4 of the present invention.

Embodiment 8

Figure 10:
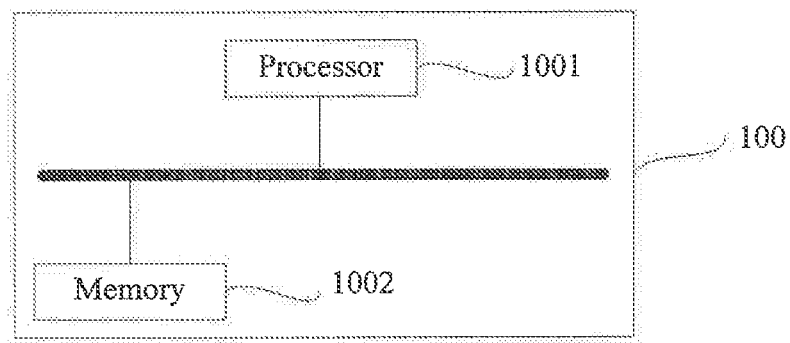
FIG. 10 is a schematic diagram of a hardware structure of a TPMS receiver according to an embodiment of the present invention.

FIG. 10 is a schematic diagram of a hardware structure of a TPMS receiver according to this embodiment of the present invention. As shown in FIG. 10, the TPMS receiver 100 includes:

one or more processors 1001 and a memory 1002. In FIG. 10, for example, there is one processor 1001.

The processor 1001 and the memory 1002 may be connected by using a bus or in another manner. In FIG. 10, for example, connection is performed by using a bus.

The memory 1002, as a non-volatile computer-readable storage medium, may be configured to store non-volatile software programs and non-volatile computer-executable programs and modules, for example, program instructions/modules (for example, the first control module 801, the response signal receiving module 802, the front and rear wheel positioning module 803, the left and right wheel positioning module 804, the second control module 805 and the spare tire positioning module 806 that are shown in FIG. 8) corresponding to the tire location positioning method provided in Embodiment 2 or Embodiment 3 of the present invention. The processor 1001 runs the non-volatile software programs, instructions and modules that are stored in the memory 1002, to perform various function applications and data processing of the TPMS receiver, to implement the tire location positioning method provided in method Embodiment 2 or Embodiment 3.

The memory 1002 may include a program storage area and a data storage area. The program storage area may store an operating system and an application program required by at least one function. The data storage area may store data or the like created according to use of the TPMS receiver. In addition, the memory 1002 may include a high-speed random access memory (RAM), and may further include a non-volatile memory such as at least one magnetic disk storage device, a flash memory or another non-volatile solid-state storage device. In some embodiments, the memory 1002 may optionally include memories that are disposed remote to the processor 1001, and these remote memories may be connected to the TPMS receiver through a network. Embodiments of the network include, but are not limited to, the Internet, an intranet, a local area network, a mobile communications network, and a combination thereof.

The one or more modules are stored in the memory 1002. When executed by the one or more processors 1001, the one or more modules perform the tire location positioning method provided in Embodiment 2 or Embodiment 3 of the present invention, for example, performing step 501 to step 506 of the method in FIG. 5 that are described above, or implementing functions of the modules 801 to 806 in FIG. 8.

The TPMS receiver may perform the tire location positioning method provided in Embodiment 2 or Embodiment 3 of the present invention, and have corresponding functional modules and beneficial effects of performing the method. For technical details that are not described in the embodiment of the TPMS receiver, reference may be made to the tire location positioning method provided in Embodiment 2 or Embodiment 3 of the present invention.

This embodiment of the present invention provides a computer program product, including a computer program stored on a non-volatile computer-readable storage medium, the computer program including a program instruction, the program instruction, when executed by the TPMS receiver, causing the TPMS receiver to perform the tire location positioning method provided in Embodiment 2 or Embodiment 3 of the present invention. For example, the TPMS receiver performs step 501 to step 506 of the method in FIG. 5 that are described above, or implements functions of the modules 801 to 806 in FIG. 8.

This embodiment of the present invention provides a non-volatile computer-readable storage medium, storing a computer-executable instruction, the computer-executable instruction being configured to cause the TPMS receiver to perform the tire location positioning method provided in Embodiment 2 or Embodiment 3 of the present invention. For example, the TPMS receiver performs step 501 to step 506 of the method in FIG. 5 that are described above, or implements functions of the modules 801 to 806 in FIG. 8.

Embodiment 9

Figure 11:
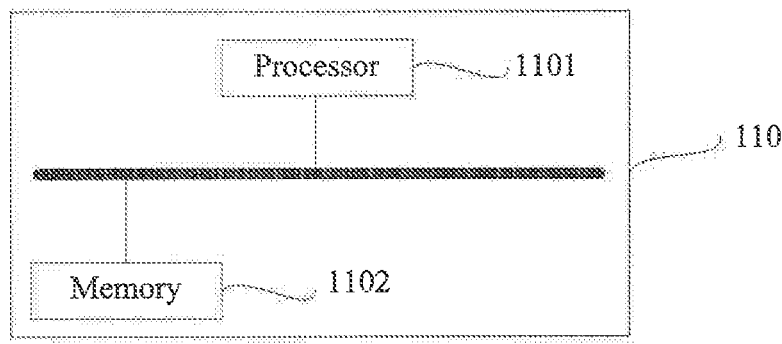
FIG. 11 is a schematic diagram of a hardware structure of a tire pressure sensor according to an embodiment of the present invention.

FIG. 11 is a schematic diagram of a hardware structure of a tire pressure sensor according to this embodiment of the present invention. As shown in FIG. 11, the tire pressure sensor 110 includes:

one or more processors 1101 and a memory 1102. In FIG. 11, for example, there is one processor 1101.

The processor 1101 and the memory 1102 may be connected by using a bus or in another manner. In FIG. 11, for example, connection is performed by using a bus.

The memory 1102, as a non-volatile computer-readable storage medium, may be configured to store non-volatile software programs and non-volatile computer-executable programs and modules, for example, program instructions/modules (for example, the excitation signal receiving module 901, the response signal generating module 902, the response signal sending module 903, the delay time determining module 904 and the response delay module 905 that are shown in FIG. 9) corresponding to the tire location positioning method provided in Embodiment 4 of the present invention. The processor 1101 runs the non-volatile software programs, instructions and modules that are stored in the memory 1102, to perform various function applications and data processing of the tire pressure sensor, that is, to implement the tire location positioning method provided in method Embodiment 4.

The memory 1102 may include a program storage area and a data storage area. The program storage area may store an operating system and an application program required by at least one function. The data storage area may store data or the like created according to use of the tire pressure sensor. In addition, the memory 1102 may include a high-speed RAM, and may further include a non-volatile memory such as at least one magnetic disk storage device, a flash memory or another non-volatile solid-state storage device. In some embodiments, the memory 1102 may optionally include memories that are disposed remote to the processor 1101, and these remote memories may be connected to the tire pressure sensor through a network. Embodiments of the network include, but are not limited to, the Internet, an intranet, a local area network, a mobile communications network, and a combination thereof.

The one or more modules are stored in the memory 1102. When executed by the one or more processors 1101, the one or more modules perform the tire location positioning method provided in Embodiment 4 of the present invention, for example, performing step 601 to step 605 of the method in FIG. 6 that are described above, or implementing functions of the modules 901 to 905 in FIG. 9.

The tire pressure sensor may perform the tire location positioning method provided in Embodiment 4 of the present invention, and have corresponding functional modules and beneficial effects of performing the method. For technical details that are not described in the embodiment of the tire pressure sensor, reference may be made to the tire location positioning method provided in Embodiment 4 of the present invention.

This embodiment of the present invention provides a computer program product, including a computer program stored on a non-volatile computer-readable storage medium, the computer program including a program instruction, the program instruction, when executed by the tire pressure sensor, causing the tire pressure sensor to perform the tire location positioning method provided in Embodiment 4 of the present invention. For example, the tire pressure sensor performs step 601 to step 605 of the method in FIG. 6 that are described above, and implements functions of the modules 901 to 905 in FIG. 9.

This embodiment of the present invention provides a non-volatile computer-readable storage medium, storing a computer-executable instruction, the computer-executable instruction being configured to cause the tire pressure sensor to perform the tire location positioning method provided in Embodiment 4 of the present invention. For example, the tire pressure sensor performs step 601 to step 605 of the method in FIG. 6 that are described above, and implements functions of the modules 901 to 905 in FIG. 9.

Embodiment 10

Figure 12:
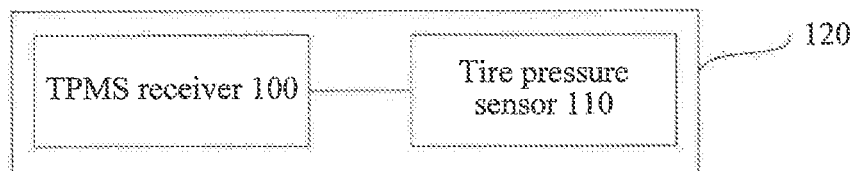
FIG. 12 is a schematic diagram of a TPMS according to an embodiment of the present invention.

FIG. 12 is a schematic diagram of a TPMS according to this embodiment of the present invention. As shown in FIG. 12, the TPMS 120 includes: the TPMS receiver 100 and the tire pressure sensor 110. The TPMS receiver is communicatively connected to the tire pressure sensor. With the TPMS receiver and the tire pressure sensor, the TPMS 120 can identify tire locations in real time without IDs of tire pressure sensors manually entered, and identification results are accurate and reliable. For technical details that are not described in the embodiment of the TPMS 120, reference may be made to the TPMS receiver 100 provided in Embodiment 8 of the present invention and the tire pressure sensor 110 provided in Embodiment 9 of the present invention.

Embodiment 11

Figure 13:
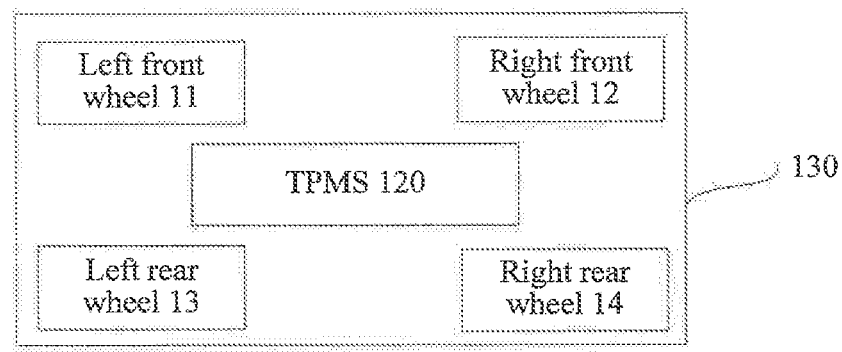
FIG. 13 is a schematic diagram of an automobile according to an embodiment of the present invention.

FIG. 13 is a schematic diagram of an automobile according to this embodiment of the present invention. As shown in FIG. 13, the automobile 130 includes the TPMS 120. The automobile 130 includes a left front wheel 11, a right front wheel 12, a left rear wheel 13 and a right rear wheel 14. With the TPMS 120, the automobile 130 can identify tire locations in real time without IDs of tire pressure sensors manually entered, and identification results are accurate and reliable.

It should be noted that the apparatus embodiments described above are merely exemplary. The modules described as separate parts may or may not be physically separate, and parts displayed as modules may or may not be physical modules, that is, may be located in one position, or may be distributed on a plurality of network modules. Some or all the modules may be selected according to actual requirements to achieve the objectives of the solutions of this embodiment.

From the descriptions of the foregoing embodiments, persons of ordinary skill in the art may clearly understand that the embodiments may be implemented by using software in combination with a universal hardware platform, or may certainly be implemented by using hardware. Persons of ordinary skill in the art may understand that all or some of the processes of the methods in the embodiments may be implemented by using computer program instructing relevant hardware. The program may be stored in a computer-readable storage medium. When the program is executed, the processes of the embodiments of the methods may be included. The storage medium may be a read-only memory (ROM), a RAM, or the like.

Finally, it should be noted that the embodiments above are merely intended for describing the technical solutions of the present invention, but not for limiting the present invention. Based on the ideas of the present invention, the embodiments above or technical features in different embodiments may be combined, the steps may be implemented in any sequence, and there are many other variations in different aspects of the present invention that are described above. For conciseness, they are not provided in detail. Although the present invention is described in detail with reference to the foregoing embodiments, persons of ordinary skill in the art should understand that they may still make modifications to the technical solutions recorded in the foregoing embodiments or make equivalent replacements to some technical features thereof, without departing from the scope of the technical solutions of the embodiments of the present invention.

What is claimed is:

1. A tire location positioning method, applied to an automobile, the automobile comprising a left front wheel, a right front wheel, a left rear wheel and a right rear wheel, and each of the wheels being provided with a tire pressure sensor, wherein the automobile further comprises a first exciter and a second exciter, the first exciter is configured to send a first excitation signal to the left front wheel and the right front wheel, and a distance between the first exciter and the left front wheel is unequal to a distance between the first exciter and the right front wheel; the second exciter is configured to send a second excitation signal to the left rear wheel and the right rear wheel, and a distance between the second exciter and the left rear wheel is unequal to a distance between the second exciter and the right rear wheel; and the method comprises:

controlling the first exciter to send the first excitation signal, and controlling the second exciter to send the second excitation signal, wherein a time when the first excitation signal is sent is different from a time when the second excitation signal is sent;

respectively receiving response signals that are generated according to the first excitation signal or the second excitation signal by all the tire pressure sensors, wherein the response signals comprise signal strength information, the signal strength information being used for representing signal strength of receiving the first excitation signal or the second excitation signal;

wherein, each of the response signals is transmitted by a tire pressure sensor according to a delay time, the delay time is determined according to a corresponding signal strength, the delay time t is calculated by a formula of t=k*p, k is a natural number, p is the corresponding to signal strength;

performing positioning on front and rear wheels according to times when the response signals are received, to identify response signals sent by tire pressure sensors of the front and rear wheels; and performing positioning on left and right wheels according to the signal strength information, to identify response signals sent by tire pressure sensors of the left and right wheels.

2. The method according to claim 1, wherein the time when the first excitation signal is sent is earlier than the time when the second excitation signal is sent; and the performing positioning on front and rear wheels according to times when the response signals are received, to identify response signals sent by tire pressure sensors of the front and rear wheels comprises:

setting two response signals that are received earlier as response signals sent by tire pressure sensors of front wheels, wherein the front wheels comprise the left front wheel and the right front wheel; and setting two response signals that are received later as response signals sent by tire pressure sensors of rear wheels, wherein the rear wheels comprise the left rear wheel and the right rear wheel.

3. The method according to claim 1, wherein the distance between the first exciter and the left front wheel is less than the distance between the first exciter and the right front wheel, and the distance between the second exciter and the left rear wheel is less than the distance between the second exciter and the right rear wheel; and the performing positioning on left and right wheels according to the signal strength information, to identify response signals sent by tire pressure sensors of the left and right wheels comprises:

setting two response signals whose signal strength is greater than a preset signal strength threshold as response signals sent by tire pressure sensors of left wheels, wherein the left wheels comprise the left front wheel and the left rear wheel; and setting two response signals whose signal strength is less than the preset signal strength threshold as response signals sent by tire pressure sensors of right wheels, wherein the right wheels comprise the right front wheel and the right rear wheel.

4. The method according to claim 1, further comprising: controlling the first exciter to resend the first excitation signal and controlling the second exciter to resend the second excitation signal if a quantity of received response signals is less than a preset quantity threshold.

5. The method according to claim 1, wherein the automobile further comprises a spare tire, the spare tire being provided with a tire pressure sensor; and the method further comprises:

after the left front wheel, the right front wheel, the left rear wheel and the right rear wheel are determined according to the positioning on the front and rear wheels and the positioning on the left and right wheels, setting, if a periodic positioning signal is received, the positioning signal as a positioning signal sent by the tire pressure sensor of the spare tire.

6. A tire location positioning method, applied to an automobile, the automobile comprising a tire pressure monitoring system (TPMS) receiver, wherein the method comprises:

receiving an excitation signal;

generating a response signal according to the excitation signal, wherein the response signal comprises signal strength information, the signal strength information being used for representing signal strength of receiving the excitation signal;

determining, according to the signal strength information, a delay time for the generated response signal; and sending the response signal to the TPMS receiver according to the delay time, wherein the delay time t is calculated by a formula of t=k*p, k is a natural number, p is the corresponding to signal strength.

7. A tire pressure monitoring system (TPMS) receiver, comprising:

at least one processor; and a memory that is communicatively connected to the at least one processor, wherein the memory stores an instruction executable by the at least one processor, the instruction, when executed by the at least one processor, enabling the at least one processor to control the first exciter to send the first excitation signal, and controlling the second exciter to send the second excitation signal, wherein a time when the first excitation signal is sent is different from a time when the second excitation signal is sent; respectively receive response signals that are generated according to the first excitation signal or the second excitation signal by all the tire pressure sensors, wherein the response signals comprise signal strength information, the signal strength information being used for representing signal strength of receiving the first excitation signal or the second excitation signal; perform positioning on front and rear wheels according to times when the response signals are received, to identify response signals sent by tire pressure sensors of the front and rear wheels; and perform positioning on left and right wheels according to the signal strength information, to identify response signals sent by tire pressure sensors of the left and right wheels;

wherein, each of the response signals is transmitted by a tire pressure sensor according to a delay time, the delay time is determined according to a corresponding signal strength, the delay time t is calculated by a formula of t=k*p, k is a natural number, p is the corresponding to signal strength.

* * * * *